Aug. 19, 1969 F. WELTY Re. 26,647
APPARATUS FOR CONTROLLING THE RATE OF FLOW OF LIQUIDS
Original Filed March 23, 1965
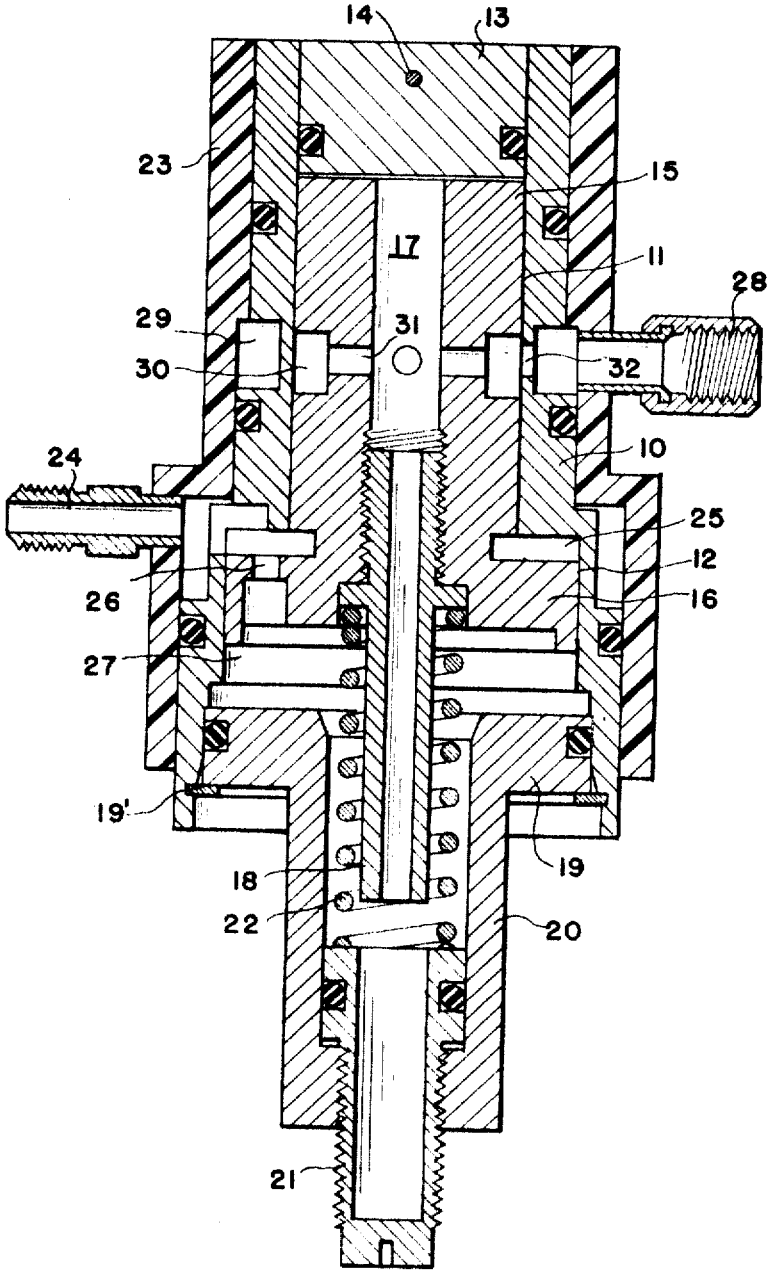
INVENTOR.
FRANK WELTY
BY Francis J. Klumpp
ATTORNEY United States Patent Office Re. 26,647
Reissued Aug. 19, 1969

26,647
APPARATUS FOR CONTROLLING THE RATE OF FLOW OF LIQUIDS

Frank Welty, 4962 Lockwood Blvd.,
Youngstown, Ohio 44511

Original No. 3,335,749, dated Aug. 15, 1967, Ser. No. 442,053, Mar. 23, 1965. Application for reissue June 24, 1968, Ser. No. 748,577
Int. Cl. F16k *31/12*
U.S. Cl. 137—504 4 Claims

Matter enclosed in heavy brackets [ ] appears in the original patent but forms no part of this reissue specification; matter printed in italics indicates the additions made by reissue.

*ABSTRACT OF THE DISCLOSURE*

*A flow control device for liquids under varying pressure and having varying viscosity and having a biased valving element controlling the flow of liquid therethrough, the liquid path through said device arranged to effect differential control pressures on opposite sides of said valving element.*

This invention relates to apparatus for controlling the rate of flow of liquids and more particularly to improvements in such apparatus whereby the sensitivity of adjustment is drastically reduced, any tendency to hunt or oscillate is eliminated, and the ability to effectively respond to and compensate for changes in the viscosity of the liquid being controlled is greatly improved in applications where it is desirable to compensate for viscosity variations. More specifically, the primary object of the present invention is to provide a liquid flow control device which is practical for use in commercial applications such as soft drink mixing and vending equipment wherein the device must remain operative over long periods of rather severe conditions of service, and, depending on its particular end use be capable of compensating not only for widely fluctuating pressures but also for wide variations in the viscosity of the liquid being handled. In the latter application involving principally the handling of flavoring syrups substantial difficulty has heretofore been encountered in attempting to achieve a constant rate of flow due to the fact that the syrup is quite fluid when warm but heavy and viscous when cold.

While the prior art has heretofore proposed flow rate control devices compensating for variations in both pressure and viscosity, such devices have been and are for handling lubricating oils for powering hydraulic devices where the problem of compensating for viscosity changes is rather minor. Further, such prior art devices have not solved the problems of hunting or oscillation or humming of the valving element, and are subject to rapid deterioration due principally to the breakdown of the biasing springs employed. Also, the prior art devices are overly critical in their adjustment whereby it is impossible to obtain precise regulation as is required in the proportioning of flavoring syrup to carbonated water in soft drink dispensing, for example, and whereby the regulators are not capable of remaining in precise adjustment over long periods of time. It is accordingly another object of this invention to provide a practical liquid flow controlling device which overcomes these stated objections.

Yet another object of the invention is the provision of an improved mechanical arrangement in a device having the improved operating characteristics outlined above which may be quickly and easily disassembled for inspection and cleaning and readily reconstituted for subsequent use without disturbing the basic adjustment of the device.

The above and other objects and advantages of the invention will become apparent upon consideration of the following specification and the accompanying drawing wherein there is illustrated a preferred embodiment of the invention.

The sole figure of the drawing is a longitudinal section through a liquid flow control valve constructed according to the principles of the invention and embodying the preferred arrangement of parts thereof.

In the drawing, reference numeral 10 designates a generally cylindrical body or housing having a first bore 11 at one end an an axially connected larger bore 12 at its other end. The free end extremity of the bore 11 is closed off by a plug 13 held in position by a transverse pin 14, and suitable O-ring sealing means as illustrated may be employed to prevent leakage. Slideably received in the body 10 is a valving element comprised of a plunger 15 received in bore 11 and a piston 16 received in bore 12. The plunger 15 and piston 16 are preferably made integral and this assembly has a longitudinal thru-bore 17.

The lower end portion of the bore 17 is screw-threaded to receive the upper end portion of a depending restriction tube 18. While the latter is preferably elongated it is also readily replaceable, by reason of its screw-threaded mounting, and it should be obvious that this tube may be readily replaced by tubes of different lengths and internal diameters to vary the operating characteristic of the overall assembly. Closing off the bottom end of the bore 12 of the housing 10 is an O-ring sealed fitting 19 having a centrally disposed depending boss 20 into which the lower end portion of the tube 18 may extend. The fitting 19 is held in place by a readily removable spring ring 19. An adjusting screw 21 is screw threaded in the bottom wall of the boss 20 in axial alignment with the tube 18 and supports the bottom end of a helical compression spring 22, the upper end of which bears, in effect, against the bottom side of the piston 16 tending to move the piston and plunger assembly in an upward direction, as viewed in the drawing.

Enclosing substantially the whole of the outer wall of the housing 10 is a tubular casing 23 which may be formed of decorative plastic material or highly finished to present a pleasing appearance. An inlet fitting 24 is secured to the side wall of the casing 23 and provides an inlet passage to an annular space 25 which is on the top side of the piston 16. Leading downwardly from this space 25 and extending effectively and axially through the piston 16 is a short, sharp orifice 26. During operation of the control device the downward flow of liquid through the orifice 26 discharges into a space 27 which is on the bottom side of the piston 16, and it should be noted that this space 27 is in open communication with the bottom inlet end of the tube 18.

Also mounted on the casing 23 at a point intermediate the ends of the bore 11 is an outlet fitting 28 which communicates with an annular groove 29 formed in the outer surface of the housing 10. A similar groove 30 is formed at about the same axial location in the plunger 15, and radial passages 31 formed in the plunger provides communication between the bore 17 therein and the groove 30 while other radial passages 32 formed in the housing 10 provides communication between the groove 30 and the groove 29 leading to the outlet fitting 28.

It should be noted that the upper radial wall of the groove 30 cooperates with the radial passages 32 to throttle the outlet of liquid from the device, and throughout this specification these cooperating components will be sometimes referred to as a valve or valve means. The arrangement is such that as the plunger 15 moves downwardly this valve or valve means will be progressively closed against the action of the spring 22 which in such case will be progressively compressed. It should also be noted that in the absence of any fluid dynamic forces as when the conduit (not shown) leading from the fitting 28 is shut off the spring 22 acts to move the piston and plunger assembly to full upward position wherein the valve is fully opened. This condition prevails regardless of the liquid pressure existent at the inlet 24. It should also be noted that the piston and plunger assembly is completely engulfed in liquid, a factor which becomes of considerable importance in achieving the optimum characteristics of the device of the invention as will be more fully explained below.

Considering now the operation of the device described above, it is well initially to bear in mind that for any given orifice carrying flowing liquids the pressure drop between the inlet and outlet ends thereof is a function of the rate of flow of the liquid. The greater the rate of flow the greater the pressure drop, and assuming at the outset that liquid is permitted to flow through the device against a low pressure existent at the outlet fitting 28 it will be understood that an increase in liquid pressure at the inlet 24 will raise the pressure drop across the orifice 26 causing the piston and plunger assembly to move downwardly against the action of the spring 22 thereby further throttling the valve 30, 32. If the applied inlet pressure should drop there will be less pressure differential between spaces 25 and 27 and the spring will operate to raise the plunger and open the valve further. In this manner the device of this invention operates to consistently deliver or pass a uniform quantity of liquid per unit of time regardless of variations in the pressure of the liquid source 24.

Because both axial ends of the moving assembly comprised of the plunger 15 and piston 16 are always engulfed in liquid, it will be understood that this assembly is inherently damped and cushioned at both ends so that it moves rather slowly from one position of adjustment to the other and is incapable of hunting or rapid oscillation or humming. Further, since the fluid pressure at the upper axial end of the plunger 15 is effectively almost opposed by the fluid pressure existent in the space 27 a near balance is achieved which makes not only for sensitivity but also efficiency in the function of the orifice 26 since lower differentials and force is required to be generated to throttle the valve. However by judicious selection of areas in the detailed design of the device it is possible to avoid criticalness in the adjustment of the screw 21—i.e., permitting this screw to be rotated a full turn, for example in making only a very slight change in the rate of flow of liquid through the device. Further, the adjustment once made is stable to a high degree due probably to the balanced and cushioned nature of the valve plunger and the lack of any resonant motion of any of the moving parts.

So long as the liquid translated has a predetermined degree of fluidity or viscosity, the above described device will maintain a preset rate of flow over long periods of time and under widely varying pressures, making the device well suited for commercial applications where the users may have no knowledge of the construction or operation of the device and where the conditions of service may be severe. This may be for handling plain or carbonated water, for example. If, however, the device is to be used for handling liquids which vary in viscosity with temperature—flavoring syrups, for example—the tubular restriction 18 must be used and selected with care as to diameter and length for the particular liquid or liquids to be handled. This is so because in the case of viscous fluids varying surface tensions affect the flow through orifice 26 and the resultant downward force applied to the piston 16. Compensation for this is achieved by the drop in pressure along the tube 18 between its bottom inlet end and its upper outlet end and the resultant force is applied to the valve plunger 15 in a direction tending to further uncover the ports 32. By properly selecting the internal diameter and length of the tube 18 in relation to the parameters of the orifice 26 it is possible to achieve, in the device of this invention, very close regulation of the rate of flow of a liquid through the device under widely varying conditions of temperature and viscosity. It should be noted that under normal conditions of use the pressure in outlet fitting 28 will be relatively low and that any dynamic reaction to the outflow of viscous fluids through the ports 32 will be radially inward and have little or no effect on the axial position of the valve plunger 15.

Due primarily to the length of the restricted bore in the fitting 18, the dynamic axial force exerted by the flow of liquid through this fitting to the valve plunger will be a function of the viscosity of the flowing liquid. Thus, the restriction provided by the fitting 18 may be considered as a viscosity corrective or compensating device. Obviously, if the liquid is cold and sticky a greater axial force will be exerted on the valve causing the ports 32 to be uncovered a further amount regardless of the increased downward force which may be exerted on the piston 16. If the liquid is warm and highly fluid, the axial force will be less and the ports 32 will be partially closed to throttle the output of the device under the control of the pressure drop across orifice 26. *The orifice 26 has been illustrated and described herein as being formed through a peripheral area of the piston 16 which is part of the plunger 15.*

It should now be apparent that I have provided an improved liquid flow control device which accomplishes the objects initially set out above. In actual practice the device has proved itself capable of accurately regulating the rate of flow of sugar laden flavoring syrups under widely varying inlet pressures and under fairly wide temperature variations which seriously affect the viscosity of the liquid. Further, it should be noted that the device may be readily disassembled for inspection, cleaning, or interchange of parts simply by removing the snap ring 19 which permits the entire inner workings of the device to be withdrawn. When the plunger and piston assembly is so removed from the housing 10 the tube 18 may be readily interchanged in the assembly to provide a viscosity control restriction which is tailored to the characteristics of the liquid to be handled. Also, it should be obvious that the outlet casing 23, which has only a sliding fit over the housing 10, may be readily slipped off the housing 10 merely by the application of an adequate pulling force.

Since the plunger 15 is balanced by fluid pressure at either end the device operates uniformly and consistently regardless of the downstream back pressure which may be applied to the fitting 28. The only force tending to throttle the valve 30, 32 against the action of the spring 22 is the differential pressures existent on opposite sides of that peripheral portion of the piston 16 which is radially outward of the cylindrical projection of the bore 11. This makes for a sensitivity of the control but nevertheless reduces the criticalness of the adjustment of the screw 21. The device is easy to set for any rate of flow within its capacity and when once the adjustment is made the same remains stable.

Having thus described my invention what I claim is:

1. A flow control device for liquids under varying pressure and having varying viscosity comprising a valve housing with spaced inlet and outlet ports and a unitary valving element movable in said housing for controlling the flow of liquid *in a path* between said inlet port and the outer port [an adjustable] yielding means to bias said element toward a predetermined valving position, a first means [on said element] *in said path* to create a force [thereon] *on said element* proportional to the rate of flow of liquid through said device tending to move said element in one direction, and a second means [on said element] *in said path* operative to create an opposing force on said element proportional to the viscosity of the liquid passing through said device tending to move said element in the opposite direction, said first means comprising a short orifice through a *communicating* portion of said [element] *device* through which the liquid flows along its path between said inlet and outlet ports in a direction creating a pressure drop and a resulting force in opposition to said biasing means, and said second means comprising an elongated restricted passage [on the downstream side of] *in* said pan.

2. A device according to claim 1 further including a closed cavity in said housing into which at least a portion of said element moves to open said outlet port, and passage means in said element interconnecting said cavity and the outlet end of said elongated restricted passage, the arrangement being such that said cavity is normally filled with liquid and thus operates as an inherent damping means to resist abrupt movement of said element in a direction opening said outlet port.

3. A flow control device for liquids of varying viscosity and having varying inlet pressure comprising a housing having an internal bore of a first diameter and an axially connected internal bore of an enlarged diameter, a plunger slideably received in said first mentioned bore and connected to a piston slideably received in the enlarged bore means closing off the outer free ends of said bores, an axial opening through said plunger and piston defining a restriction for the flow of liquid and along which a pressure drop is developed in proportion to the viscosity of the liquid an outlet valve on said plunger at the outlet end of said restriction, an inlet passage in said housing leading to the side of said piston which is towards said plunger and said piston having an orifice therethrough, an adjustable compression spring bearing against the opposite side of said piston, the arrangement being such that said valve opens upon the application of the force created by said pressure drop augmented by the expansive force exerted by said spring while said valve is throttled to close position by the application of force to said piston created by the pressure drop in the liquid flowing through said orifice.

4. A flow control valve for liquids of varying viscosity and subject to varying pressure comprising a tubular housing closed at either end and having an internal bore of a first diameter in one end portion thereof and an internal bore of a larger diameter in the other end portion thereof, a piston slideably received in the enlarged bore having a connected plunger slideably received in the bore of first diameter, said piston and plunger having an axial opening therethrough, a sleeve valve on said plunger communicating with said opening and cooperating with an outlet port formed in the wall of said bore of first diameter, an inlet passage in said housing leading into a first space defined by said bore of larger diameter on the side of said piston which is toward said plunger, an orifice through said piston leading into a second space, an adjustable compression spring in said second space bearing against the opposite face of said piston, and said opening defining a restricted passage between said second space and sleeve valve whereby the pressure drop in fluid passing through said opening between said second space and sleeve valve is a function of the viscosity of the liquid flowing through the valve, the force of said spring and the force resulting from said pressure drop tending to open said sleeve valve while the force exerted on said piston by reason of the flow of liquid through said orifice tends to compress said spring and close said sleeve valve, and said plunger being balanced and dampened by reason of the presence of liquid at both ends thereof.

References Cited

The following references, cited by the Examiner, are of record in the patented file of this patent or the original patent.

UNITED STATES PATENTS

| | | | |
|---|---|---|---|
| 562,131 | 6/1896 | Gordon | 137—501 |
| 2,935,083 | 5/1960 | Singer | 137—505.25 |
| 3,155,111 | 11/1964 | Presnell | 137—504 |

ARNOLD ROSENTHAL, Primary Examiner

PO-1050
(5/69)

UNITED STATES PATENT OFFICE
CERTIFICATE OF CORRECTION

Patent No. RE 26,647 Dated August 19, 1969

Inventor(s) Frank Welty

It is certified that error appears in the above-identified patent and that said Letters Patent are hereby corrected as shown below:

Column 4 line 66 "outer" should read---outlet---.

Column 5 line 7 "pan" should read ---path---.

SIGNED AND
SEALED
DEC 2 - 1969

(SEAL)
Attest:

Edward M. Fletcher, Jr.
Attesting Officer

WILLIAM E. SCHUYLER, JR.
Commissioner of Patents